United States Patent Office 2,844,602
Patented July 22, 1958

2,844,602

4-METHYL TESTOSTERONE COMPOUNDS

Howard J. Ringold and George Rosenkranz, Mexico City, Mexico, assignors to Syntex S. A., Mexico City, Mexico, a corporation of Mexico No Drawing. Application January 29, 1957
Serial No. 636,859

Claims priority, application Mexico January 31, 1956

34 Claims. (Cl. 260—397.4)

The present invention relates to cyclopentanophenanthrene derivatives and to a process for the production thereof.

More particularly the present invention relates to novel androgenic hormones which are 4-alkyl and 4-aralkyl derivatives of testosterone, dihydrotestosterone, 17-lower alkyl testosterone and 17-lower alkyl dihydrotestosterone. The novel useful androgens of the present invention differ substantially in their characteristics from the same compounds without a substituent in C-4 especially in that they have a higher anabolic-androgenic ratio. For example in the standard rat assay 4-methyltestosterone had 40% of the androgenic activity and 120% of the myotropic (anabolic) activity of testosterone.

In accordance with the present invention it has been discovered that the novel compounds just described may be prepared by reacting etiocholanolone (testan-17β-ol-3-one) with ethyl oxalate in the presence of sodium hydride to give the corresponding 4-ethoxyglyoxyl derivative. This last derivative upon treatment with an alkyl iodide or an aralkyl iodide gave the 4-alkyl or aralkyl-4'-ethoxyglyoxal-etiocholan-17-β-ol-3-one derivative and treatment with sodium ethoxide gave the corresponding 4-alkyl or aralkyl etiocholan compound. Monobromination and dehydrobromination gave the corresponding novel $\Delta^4$-derivatives and hydrogenation of these the corresponding noval androstone and testane compounds. Further reduction with sodium borohydride gave the novel androgenic 3-alcohols of both the $\Delta^4$-compounds and the androstane compounds.

The noval androgenic hormones of the present invention may therefore be exemplified by the following formulas:

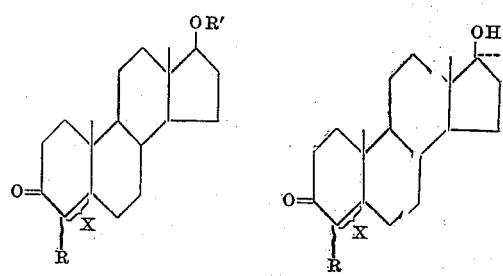

and

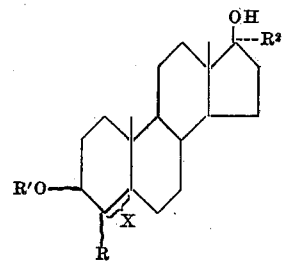

In the above formulas R represents an alkyl or aralkyl group, preferably a lower alkyl group of less than 7 carbon atoms, such as methyl or ethyl, or the benzyl group. R' represents hydrogen or an acyl group of the type conventionally found in esterified steroid alcohols, these are those generally derived from hydrocarbon carboxylic acids of less than 12 carbon atoms such as acetic, propionic, cyclopentylpropionic, benzoic etc. $R^2$ represents a lower alkyl group of less than 7 carbon atoms such as methyl, ethyl or propyl. X represents a double bond between C-4 and C-5 and a saturated linkage between C-4 and C-5.

The novel compounds of the present invention may be prepared by a process exemplified in part by the following equation:

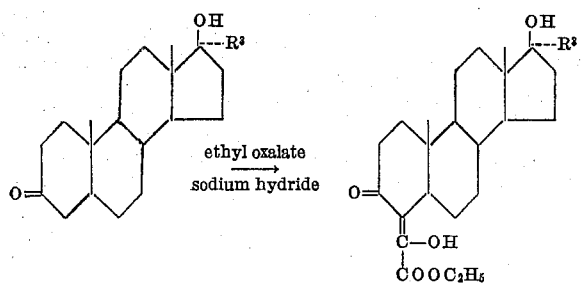

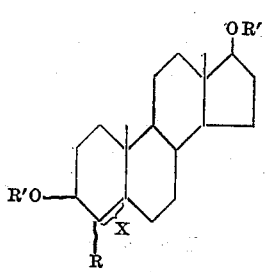

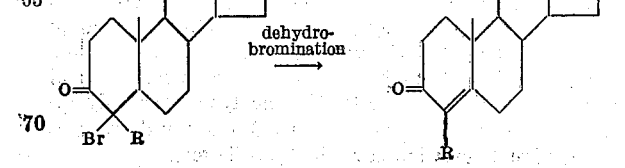

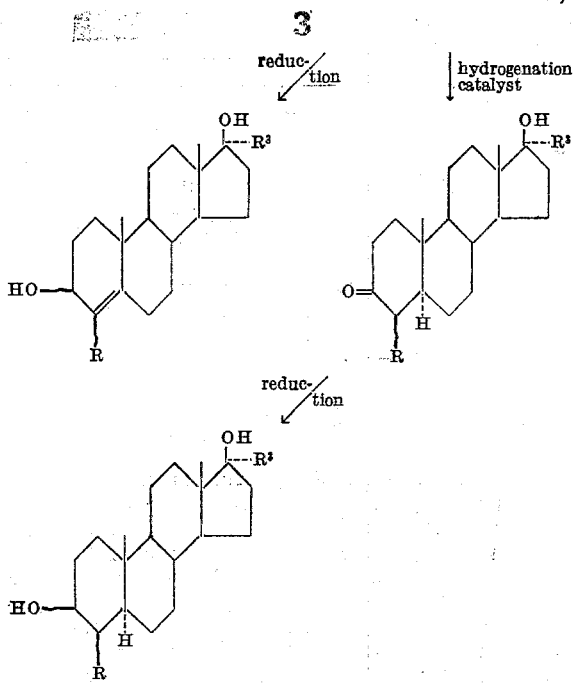

In the above equation $R^3$ represents hydrogen or is the same as $R^2$ previously referred to.

In practicing the process above outlined etiocholan (testan)-17β-ol-3-one or its derivatives having a 17α-lower alkyl group, are dissolved in an organic solvent such as benzene and treated with ethyl oxalate and sodium hydride. The reaction mixture is stirred for a period of time of the order of 4 hours and then treated with water. The product upon acidification and separation from the aqueous phase was the corresponding 4-ethoxy-glyoxyl derivative.

The glyoxyl derivative was then dissolved in an organic solvent such as acetone and mixed with potassium carbonate and an alkyl or aralkyl iodide, such as methyl, ethyl or benzyl iodide. After about 40 hours under reflux the product after concentration, partial purification procedure was the corresponding 4-alkyl or aralkyl-4′-ethoxyglyoxyl-etiocholan-17β-ol-3-one derivative. The partially crude product was then dissolved in a solution of sodium ethoxide in ethanol and the solution kept standing for about 18 hours at room temperature. Upon addition of water, extraction with an organic solvent and chromatography the corresponding 4-alkyl or aralkyl-etiocholan-17β-ol-3-one derivative was obtained.

These derivatives upon monobromination (with slightly over 1 molar equivalent of bromine) gave the corresponding 4-bromo compounds and upon dehydrobromination with a tertiary amine such as collidine the corresponding Δ⁴-compounds were formed. These may be characterized in general as 4-alkyl or aralkyl derivatives of testosterone or 4-alkyl or aralkyl derivatives of 17α-lower alkyl testosterone. By conventional acylation procedures as by treatment with acid anhydrides there was prepared the 17-esters of the 4-alkyl or aralkyl derivatives of testosterone. These esters were those of hydrocarbon carboxylic acids of less than about 12 carbon atoms.

The Δ⁴-compounds upon hydrogenation in the presence of a hydrogenation catalyst preferably a palladium catalyst gave a mixture of the corresponding testane and androstane compounds.

Upon reduction with sodium borohydride of either the Δ⁴-compounds or the corresponding saturated derivatives the 3-keto group was transformed to a 3-hydroxy group; a mixture of the 3α and 3β alcohols being found. In the case of compounds having a 17α-alkyl group conventional acylation gave 3-mono-esters of the type previously referred to, in the case of the other 3-hydroxy derivatives conventional acylation gave the 3,17-diesters.

The following specific examples serve to illustrate but are not intended to limit the present invention.

*Example I*

2 g. of etiocholan-17β-ol-3-one in 50 cc. of anhydrous benzene free of thiophene was treated with 1 cc. of ethyl oxalate and 600 mg. of sodium hydride. The mixture was stirred for 4 hours under an atmosphere of nitrogen, cooled and treated dropwise with water to decompose the excess of hydride, followed by 100 cc. more of water. The precipitated enol salt was stirred, and the aqueous solution was separated from the sodium salt. Acidification of the aqeuous phase and extraction with methylene dichloride afforded 2.1 g. of the 4-ethoxy-glyoxyl derivative.

2 g. of the above compound was dissolved in 100 cc. of anhydrous acetone, mixed with 1 g. of anhydrous potassium carbonate and 5 cc. of methyl iodide and the mixture was refluxed for 40 hours and then concentrated almost to dryness and diluted with 50 cc. of methylene dichloride. The mixture was extracted twice with 100 cc. portions of a cold 1% solution of sodium hydroxide and the methylene chloride solution was separated and evaporated to dryness, thus producing 4-methyl-4′-ethoxyglyoxyl-etiocholan-17β-ol-3-one, which was used without further purification for the next step.

The crude product obtained in the previous operation was dissolved in a solution of sodium ethoxide in ethanol (prepared by dissolving 1 g. of sodium metal in 50 cc. of anhydrous ethanol) and the solution was kept standing for 18 hours at room temperature. 300 cc. of water was then added, the mixture was extracted with methylene dichloride and the methylene dichloride solution was evaporated to dryness. Chromatography of the product on a column with 50 g. of neutral alumina yielded, upon elution with benzene, 600 mg. of 4-methyl-etiocholan-17β-ol-3-one.

500 mg. of this compound was dissolved in 100 cc. of glacial acetic acid containing one drop of a solution of hydrogen bromide in acetic acid and then treated dropwise under continuous stirring with 1.1 molar equivalents of bromine in 5 cc. of acetic acid at 15° C. The solution was diluted with water and the precipitate was collected to give 550 mg. of 4-bromo-4-methyl-etiocholan-17β-ol-3-one.

500 mg. of this compound was refluxed for 1 hour with 3 cc. of collidine. The cooled mixture was diluted with 20 cc. of ethyl acetate, the precipitated collidine hydrobromide was filtered and the ethyl acetate solution was washed with dilute sulfuric acid and then with water until neutral. The solution was evaporated to dryness and the residue was chromatographed on a column with 25 g. of alumina. The fractions eluted with benzene-ether (9:1) yielded 200 mg. of 4-methyl-testosterone having a melting point of 169–171° C., $[\alpha]_D$ +121° (chloroform).

Routine acetylation with acetic anhydride in pyridine solution afforded the acetate of 4-methyl-testosterone. By similar routine acetylation with acid anhydrides and chlorides there was also prepared other esters of hydrocarbon carboxylic acids of less than 12 carbon atoms such as the propionate, cyclopentylpropionate and benzoate.

*Example II*

Following the method described in Example I, but using ethyl iodide instead of methyl iodide, there was obtained 4-ethyl-testosterone and its esters.

*Example III*

Following the method described in Example I, but using benzyl iodide instead of methyl iodide, there was obtained 4-benzyl-testosterone and its esters.

*Example IV*

A solution of 50 g. of 17α-methyl-testosterone in 1 l.

of methanol was hydrogenated at a pressure of 25 p. s. i., at room temperature, in the presence of 5 g. of 5% palladium on barium sulfate catalyst, until the equivalent of one mol of hydrogen had been absorbed. The catalyst was filtered, the solution was evaporated to dryness and the residue was chromatographed in a column with 2 kg. of neutral alumina to separate the 17α-methyl-androstan-17β-ol-3-one from 17α-methyl-etiocholan-17β-ol-3-one.

2 g. of 17α-methyl-etiocholan-17β-ol-3-one was subjected to the sequence of reactions described in Example I, thus giving 4,17α-dimethyl-Δ⁴-androsten-17β-ol-3-one.

Example V

Following the method described in Example IV, and starting from 17α-ethyl-testosterone, there was obtained 4-methyl-17α-ethyl-Δ⁴-androsten-17β-ol-3-one.

Example VI

Following the method described in Example V, but using ethyl iodide instead of methyl iodide, there was obtained 4,17α-diethyl-Δ⁴-androsten-17β-ol-3-one.

Example VII

By obvious variations to the methods described previously, there were prepared the following derivatives of testosterone: 4-ethyl-17α-methyl, 4-methyl-17α-propyl, 4-ethyl-17α-propyl, 4-benzyl-17α-methyl, 4-benzyl-17α-ethyl and 4-benzyl-17α-propyl.

Example VIII 1 g. of 4-methyl-testosterone in 50 cc. of methanol was hydrogenated at room temperature and atmospheric pressure in the presence of a previously reduced 5% palladium on barium sulfate catalyst. In the course of 1 hour the equivalent of 1 molar equivalent of hydrogen was absorbed. The catalyst was filtered, the filtrate was evaporated to dryness and the residue was chromatographed in a column with 100 g. of neutral alumina, thus giving as a main fraction 4-methyl-androstan-17β-ol-3-one and as a secondary fraction 4-methyl-etiocholan-17β-ol-3-one.

In the same way there were prepared 4-ethyl-androstan-17β-ol-3-one and 4-benzyl-androstan-17β-ol-3-one.

From the above compounds there were prepared their 17-acetates by routine acetylation with acetic anhydride in pyridine solution, at the temperature of the steam bath. By similar routine acylation with acid anhydrides and chlorides there was also prepared other esters of hydrocarbon carboxylic acids of less than 12 carbon atoms such as the propionate, cyclopentylpropionate and benzoate.

Example IX 1 g. of 4,17α-dimethyl-testosterone, obtained in accordance with Example IV, was treated as described in Example VIII, thus producing 4,17α-dimethyl-androstan-17β-ol-3-one.

Similarly, the following derivatives of androstan-17β-ol-3-one were prepared: 4-methyl-17α-ethyl, 4-methyl-17α-propyl, 4-ethyl-17α-methyl, 4,17α-diethyl, 4-ethyl-17α-propyl, 4-benzyl-17α-methyl, 4-benzyl-17α-ethyl and 4-benzyl-17α-propyl.

Example X

A solution of 1 g. of 4-methyl-testosterone in 20 cc. of methanol was treated with 100 mg. of sodium borohydride previously dissolved in 2 cc. of water and the mixture was kept standing overnight at room temperature. The solvent was evaporated under reduced pressure, water and a few drops of acetic acid were added to the residue and the reaction product was filtered to give a mixture of 4-methyl-Δ⁴-androsten-3α,17β-diol and 4-methyl-Δ⁴-androsten-3β,17β-diol whose separation was not attempted. In an analogous way there were obtained the 4-ethyl and 4-benzyl derivatives.

From all of the compounds mentioned in this example, there were prepared their 3,17-diacetates by reaction with acetic anhydride in pyridine solution at the temperature of the steam bath. By similar routine acylation with acid anhydrides and chlorides there was also prepared other esters of hydrocarbon carboxylic acids of less than 12 carbon atoms such as the propionate, cyclopentylpropionate and benzoate.

Example XI 4 g. of 4-methyl-androstan-17β-ol-3-one was treated in accordance with the method described in Example X, and there was obtained a mixture of 4-methyl-androstane-3α,17β-diol and 4-methyl-androstan-3β,17β-diol.

In the same way there were obtained the 4-ethyl and 4-benzyl derivatives. From all of the compounds mentioned in this example, there were prepared their 3-monoacetates by reaction with acetic anhydride in pyridine solution at the temperature of the steam bath. By similar routine acylation with acid anhydrides and chlorides there was also prepared other esters of hydrocarbon carboxylic acids of less than 12 carbon atoms such as the propionate, cyclopentylpropionate and benzoate.

Example XII

The treatment of 4,17α-dimethyl-testosterone by the method described in Example X afforded a mixture of 4,17α-dimethyl-Δ⁴-androsten-3α,17β-diol and 4,17α-dimethyl-Δ⁴-androsten-3β,17β-diol.

In the same way there were obtained the following derivatives of Δ⁴-androstene-3,17β-diol: 4-methyl-17α-ethyl, 4-methyl-17α-propyl, 4-ethyl-17α-methyl, 4,17α-diethyl, 4-ethyl-17α-propyl, 4-benzyl-17α-methyl, 4-benzyl-17α-ethyl and 4-benzyl-17α-propyl.

From all of the compounds mentioned in this example, there were prepared their 3-monoacetates by reaction with acetic anhydride in pyridine solution at the temperature of the steam bath.

Example XIII 1 g. of 4,17α-dimethyl-androstan-17β-ol-3-one was treated in accordance with the method described in Example X, thus yielding a mixture of 4,17α-dimethyl-androstane-3α,17β-diol and 4,17α-dimethyl-androstane-3β,17β-diol.

In the same way there can be prepared the following derivatives of androstan-3,17β-diol: 4-methyl-17α-ethyl, 4-methyl-17α-propyl, 4-ethyl-17α-methyl, 4,17α-diethyl, 4-ethyl-17α-propyl, 4-benzyl-17α-methyl, 4-benzyl-17α-ethyl and 4-benzyl-17α-propyl.

From all of the compounds mentioned in the present example, there were prepared their 3-monoacetates by reaction with acetic anhydride in pyridine solution at the temperature of the steam bath. By similar routine acylation with acid anhydrides and chlorides there was also prepared other esters of hydrocarbon carboxylic acids of less than 12 carbon atoms such as the propionate, cyclopentylpropionate and benzoate.

We claim:

1. A process for the production of compounds selected from the group consisting of 4-alkyl-Δ⁴-androsten-17β-ol-3-one, 4-aralkyl-Δ⁴-androsten-17β-ol-3-one, 17 - lower alkyl-4-alkyl-Δ⁴-androsten-17β-ol-3-one and 17 - lower alkyl-4-aralkyl-Δ⁴-androsten-17β-ol-3-one comprising condensing a compound selected from the group consisting of etiocholan-17β-ol-3-one and 17-lower alkyl-etiocholan-17β-ol-3-one with ethyl oxalate in the presence of sodium hydride to form the corresponding 4-ethoxyglyoxyl derivative, treating the last mentioned derivative with an iodide selected from the group consisting of alkyl and aralkyl iodides to form the corresponding compound selected from the group consisting of the corresponding 4-alkyl-4′-ethoxyglyoxyl and 4-aralkyl-4′-ethoxyglyoxyl derivatives, treating the last mentioned compounds with sodium ethoxide to form a compound selected from the group consisting of the corresponding 4-alkyl and 4-aralkyl-etiocholanolone derivatives, monobrominating and dehydrobrominating these last mentioned compounds.

2. A process for the production of a compound selected from the group consisting of 4-alkyl-androstan-17β-ol-3-one, 4-aralkyl-androstan-17β-ol-3-one, 17-lower alkyl-4-alkyl-androstan-17β-ol-3-one and 17-lower alkyl-4-aralkyl-androstan-17β-ol-3-one comprising hydrogenating a corresponding Δ⁴ compound in the presence of a hydrogenation catalyst.

3. A process for the production of a compound selected from the group consisting of 4-alkyl-Δ⁴-androsten-3,17β-diol, 4-aralkyl-Δ⁴-androsten-3,17β-diol, 17-lower alkyl-4-alkyl-Δ⁴-androsten-3,17β-diol, 17-lower alkyl-4-aralkyl-Δ⁴-androsten-3,17β-diol, 4-alkyl-androsten-3,17β-diol, 4-aralkyl-androsten-3,17β-diol, 17-lower alkyl-4-alkyl-androstan-3,17β-diol, and 17-lower akyl-4-aralkyl-androstan-3,17β-diol which comprises treating the corresponding 3-ketone with sodium borohydride.

4. The process of claim 1 wherein the iodide is selected from the group consisting of methyl, ethyl, or benzyl iodide and the 17-lower alkyl group is selected from the group consisting of methyl, ethyl and propyl.

5. The process of claim 2 wherein the iodide is selected from the group consisting of methyl, ethyl, or benzyl iodide and the 17-lower alkyl group is selected from the group consisting of methyl, ethyl and propyl.

6. The process of claim 3 wherein the iodide is selected from the group consisting of methyl, ethyl, or benzyl iodide and the 17-lower alkyl group is selected from the group consisting of methyl, ethyl and propyl.

7. A compound of the following formula

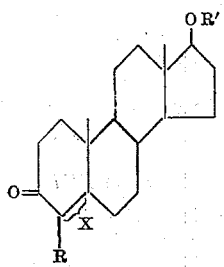

wherein R is selected from the group consisting of alkyl and aralkyl, R' is selected from the group consisting of hydrogen and acyl and X is selected from the group consisting of a double bond between C-4 and C-5 and a saturated linkage between C-4 and C-5.

8. 4-lower alkyl-Δ⁴-androsten-17β-ol-3-one.
9. 4-benzyl-Δ⁴-androsten-17β-ol-3-one.
10. 4-methyl-Δ⁴-androsten-17β-ol-3-one.
11. 4-lower alkyl-androstan-17β-ol-3-one.
12. 4-benzyl-androstan-17β-ol-3-one.
13. 4-methyl-androstan-17β-ol-3-one.
14. A compound of the following formula:

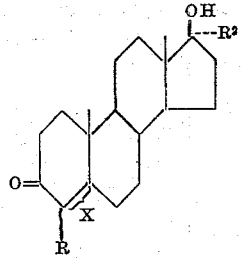

wherein R is selected from the group consisting of alkyl and aralkyl, R² represents lower alkyl, and X is selected from the group consisting of a double bond between C-4 and C-5 and a saturated linkage between C-4 and C-5.

15. 17-lower alkyl - 4 - lower alkyl-Δ⁴-androsten-17β-ol-3-one.
16. 17-lower alkyl - 4 - benzyl-Δ⁴-androsten-17β-ol-3-one.
17. 4,17-dimethyl-Δ⁴-androsten-17β-ol-3-one.
18. 17-lower alkyl - 4 - lower alkyl-androstan-17β-ol-3-one.
19. 17-lower alkyl-4-benzyl-androstan-17β-ol-3-one.
20. 4,17-dimethyl-androstan-17β-ol-3-one.
21. A compound of the following formula:

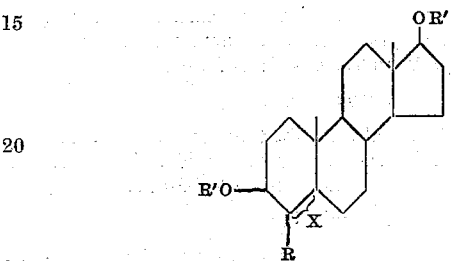

wherein R is selected from the group consisting of alkyl and aralkyl, R' is selected from the group consisting of hydrogen and acyl, and X is selected from the group consisting of a double bond between C-4 and C-5 and a saturated linkage between C-4 and C-5.

22. 4-lower alkyl-Δ⁴-androsten-3,17β-diol.
23. 4-benzyl-Δ⁴-androsten-3,17β-diol.
24. 4-methyl-Δ⁴-androsten-3,17β-diol.
25. 4-lower alkyl-androstan-3,17β-diol.
26. 4-benzyl-androstan-3,17β-diol.
27. 4-methyl-androstan-3,17β-diol.
28. A compound of the following formula:

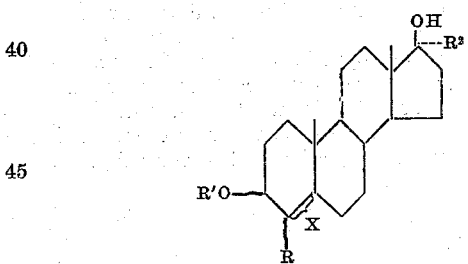

wherein R is selected from the group consisting of alkyl and aralkyl, R' is selected from the group consisting of hydrogen and acyl, R² represents lower alkyl, and X is selected from the group consisting of a double bond between C-4 and C-5 and a saturated linkage between C-4 and C-5.

29. 17-lower alkyl-4-lower alkyl-Δ⁴-androsten-3,17β-diol.
30. 17-lower alkyl-4-benzyl-Δ⁴-androsten-3,17β-diol.
31. 4,17-dimethyl-Δ⁴-androsten-3,17β-diol.
32. 17-lower alkyl-4-lower alkyl-androstan-3,17β-diol.
33. 17-lower alkyl-4-benzyl-androstan-3,17β-diol.
34. 4,17-dimethyl-androstan-3,17β-diol.

No references cited.